(12) United States Patent
Umezaki et al.

(10) Patent No.: US 8,125,734 B2
(45) Date of Patent: Feb. 28, 2012

(54) MAGNETIC SLIDER, HEAD GIMBAL ASSEMBLY AND METHOD FOR MANUFACTURING THE SAME

(75) Inventors: Hiroshi Umezaki, Kanagawa (JP); Seiji Nakagawa, Kanagawa (JP); Yuhsuke Matsumoto, Kanagawa (JP); Yoshihisa Takeo, Tokyo (JP); Gen Oikawa, Kanagawa (JP); Hiroshi Kamio, Kanagawa (JP)

(73) Assignee: Hitachi Global Storage Technologies, Netherlands B.V., Amsterdam (NL)

(*) Notice: Subject to any disclaimer, the term of this patent is extended or adjusted under 35 U.S.C. 154(b) by 923 days.

(21) Appl. No.: 11/899,605

(22) Filed: Sep. 5, 2007

(65) Prior Publication Data

US 2008/0062565 A1 Mar. 13, 2008

(30) Foreign Application Priority Data

Sep. 5, 2006 (JP) ................................. 2006-240126

(51) Int. Cl.
*G11B 5/60* (2006.01)
*G11B 5/31* (2006.01)
*G11B 15/64* (2006.01)

(52) U.S. Cl. ................................. 360/234.5; 360/245.8

(58) Field of Classification Search ............... 29/603.07, 29/846; 360/234.5, 245.8, 245.9
See application file for complete search history.

(56) References Cited

U.S. PATENT DOCUMENTS

| | | | | |
|---|---|---|---|---|
| 3,897,324 A | * | 7/1975 | Del Monte et al. | 204/298.11 |
| 4,113,578 A | * | 9/1978 | Del Monte | 205/125 |
| 4,761,699 A | * | 8/1988 | Ainslie et al. | 360/234.5 |
| 5,828,031 A | * | 10/1998 | Pattanaik | 219/121.63 |
| 6,181,531 B1 | | 1/2001 | Koshikawa et al. | |
| 6,224,690 B1 | | 5/2001 | Andricacos et al. | |
| 6,635,184 B1 | * | 10/2003 | Cohen et al. | 216/22 |
| 6,813,118 B2 | * | 11/2004 | Pust et al. | 360/234.5 |

(Continued)

FOREIGN PATENT DOCUMENTS

| | | | | |
|---|---|---|---|---|
| JP | 56016928 A | * | 2/1981 | |
| JP | 63266095 A | * | 11/1988 | |
| JP | 03120335 A | * | 5/1991 | |
| JP | 08-235527 | | 9/1996 | |
| JP | 09-181125 | | 7/1997 | |
| JP | 11-120514 | | 4/1999 | |

OTHER PUBLICATIONS

English-machine translation of JP 11-120514 to Ogawara, published on Apr. 30, 1999.*

*Primary Examiner* — Will J Klimowicz

(57) ABSTRACT

Embodiments of the present invention provide a magnetic slider of which terminals have a sufficiently large process margin for the laser condition in the SBB process. According to one embodiment, a magnetic slider comprises: a read element and a write element; plural wiring lines which are connected to the read element and the write element; a protective film which covers the read element, the write element and the plural-wiring lines; plural slider pads formed on the protective film; and plural studs which respectively connect the slider pads and the wiring lines and are covered by the protective film, wherein each of the slider pads comprises a chromium film, a nickel iron film and a gold film, the nickel iron film is formed between the chromium film and the gold film, and the chromium film is formed between the nickel iron film and one of the studs and is in contact with the protective film.

3 Claims, 8 Drawing Sheets

U.S. PATENT DOCUMENTS

| | | | |
|---|---|---|---|
| 7,400,470 B2 * | 7/2008 | Matsumoto et al. | 360/234.5 |
| 2002/0057531 A1 * | 5/2002 | Segar et al. | 360/234.5 |
| 2003/0128469 A1 * | 7/2003 | Pust et al. | 360/234.5 |
| 2005/0219753 A1 * | 10/2005 | Yamakura et al. | 360/234.5 |
| 2006/0056110 A1 * | 3/2006 | Kato et al. | 360/234.3 |
| 2006/0153508 A1 * | 7/2006 | Bowker et al. | 385/100 |
| 2006/0193084 A1 * | 8/2006 | Satoh et al. | 360/234.5 |
| 2006/0238921 A1 * | 10/2006 | Matsumoto et al. | 360/234.5 |

* cited by examiner

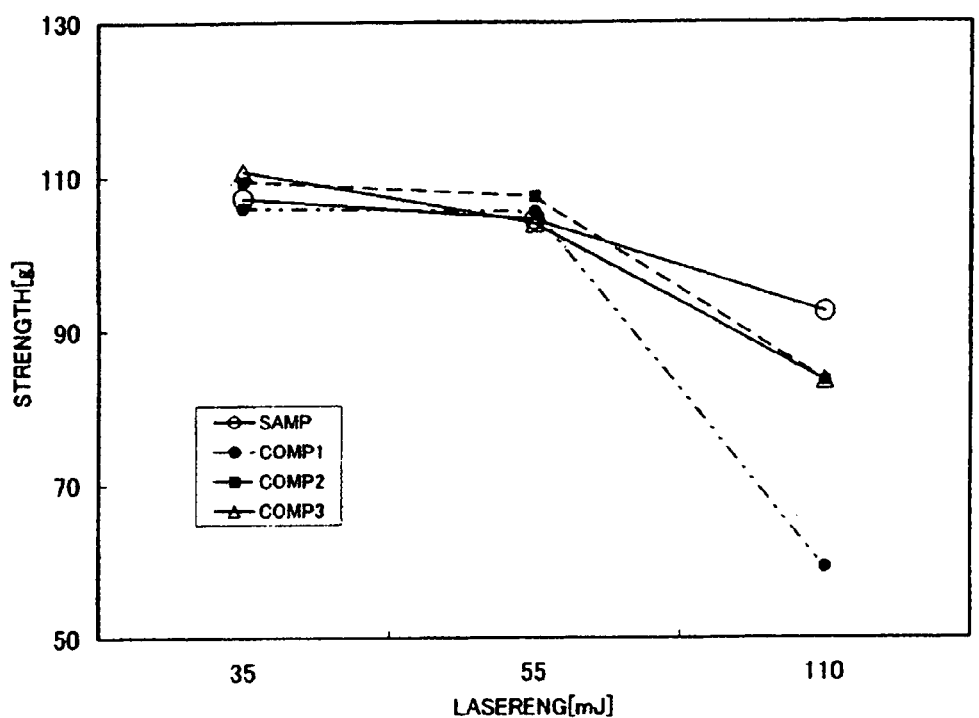

| Specimen (n=45) | Comparison Pad 1 Cr/Au | Comparison Pad 2 Ta/Au | Comparison Pad 3 Cr/Ta/Au | Present Embodiment Cr/NiFe/Au |
|---|---|---|---|---|
| Resistance NG Rate | 2.2% | 0.0% | 0.0% | 0.0% |
| Gold Pad Peel Off | Found | Found | Found | Not Found |
| Sn Diffusion into Cu Stud | Found | Found | Found | Not Found |

# MAGNETIC SLIDER, HEAD GIMBAL ASSEMBLY AND METHOD FOR MANUFACTURING THE SAME

CROSS-REFERENCE TO RELATED APPLICATION

The instant nonprovisional patent application claims priority to Japanese Patent Application No. 2006-240126 filed Sep. 5, 2006 and which is incorporated by reference in its entirety herein for all purposes.

BACKGROUND OF THE INVENTION

Since a magnetic slider is used in a magnetic disk drive, it is necessary to make a HGA (Head Gimbal Assembly) which has the magnetic slider assembled to a suspension. This assembly includes the step of mechanically affixing the magnetic slider to the suspension and the step of electrically connecting the magnetic slider to the suspension. To implement this electrical connection, gold pads on the magnetic slider are joined to lead pads on the suspension mainly by using the SBB (Solder Ball Bonding). The SBB technology sets a globular chip of solder between a gold pad and lead pad and joins them together by melting the solder with a laser. Recently, this method has become the mainstream method for electrically connecting a magnetic slider to a suspension since reliable electrical connection can be obtained and almost no concern is needed about the risk of ESD (Electro-Static Discharge).

Japanese Patent Publication No. 1996-235527 ("Patent Document 1") discloses a terminal or terminal lead pad which is fabricated by plating the rear surface (opposite to the air bearing surface) of a thin film magnetic slider with Ni, NiFe, Au, Cu or other metal and depositing Au or other bonding metal thereon. The terminal or terminal lead pad is connected to a terminal conductor of the suspension spring by thermo compression bonding, ultrasonic compression bonding or the like or by using a conductive adhesive.

Japanese Patent Publication No. 1997-181125 ("Patent Document 2") discloses a structure used to connect a semiconductor chip to a package. This structure comprises an adhesion/barrier layer adhering to the substrate of the semiconductor chip, a NiFe metal solderable layer and a lead-free solder. As the barrier layer, Cr one is cited. The NiFe metal solderable layer is designed to dissolve into the solder.

Japanese Patent Publication No. 1999-120514 ("Patent Document 3") discloses a structure for terminals of thin film magnetic heads. A barrier layer containing Cr and an electron supply layer composed of a noble metal, below an Au film, can be formed by continuous sputtering. By welding a bonding wire to the Au film, the terminal is electrically connected to a current source provided externally.

BRIEF SUMMARY OF THE INVENTION

Embodiments in accordance with the present invention provide a magnetic slider of which terminals have a sufficiently large process margin for the laser condition in the SBB process. According to one embodiment, a magnetic slider comprises: a read element and a write element; plural wiring lines which are connected to the read element and the write element; a protective film which covers the read element, the write element and the plural wiring lines; plural slider pads formed on the protective film; and plural studs which respectively connect the slider pads and the wiring lines and are covered by the protective film, wherein each of the slider pads comprises a chromium film, a nickel iron film and a gold film, the nickel iron film is formed between the chromium film and the gold film, and the chromium film is formed between the nickel iron film and one of the studs and is in contact with the protective film.

BRIEF DESCRIPTION OF THE DRAWINGS

FIG. 9 shows how the shear fracture strength of a slider pad depends on the laser energy.

FIG. 10 shows the places of slider pad fracture planes and their percentages.

DETAILED DESCRIPTION OF THE INVENTION

Figure 1:
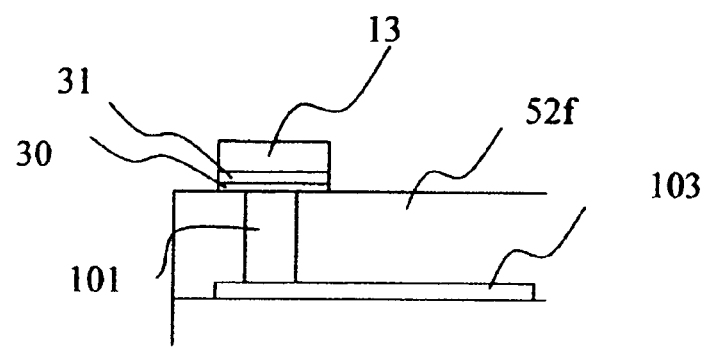
FIG. 1 shows a cross section of a magnetic slider according to an embodiment of the present invention.

Embodiments of the present invention relate to a magnetic slider used in a magnetic disk drive and, more particularly, to the gold pads or electrical connects of the magnetic slider which are structured so as to improve the process margin and reliability thereof.

Described below are those found through studies done by the inventors and others. For SBB, since a gold pad is irradiated by a laser, the gold pad is required to be heat-tolerant enough to endure this laser irradiation. In addition, the gold pad is exposed to temperature changes including temperature rises and falls while the magnetic slider is used in a magnetic disk drive. Therefore, the gold pad must be reliable enough to endure high temperature-included temperature cycle test.

The structure disclosed in Patent Document 1 has NiFe inserted below the gold as an adhesion layer. The gold pad is formed on the alumina protective film of the magnetic slider and connected to a Cu stud which goes through the alumina protective film. Thus, the gold pad is in contact with both alumina protective film and Cu stud. To secure the reliability, the gold pad must be sufficiently adhesive to both substances. However, adhesivity between gold (Au) and alumina is very low. This is because a NiFe adhesion layer is conventionally inserted below the gold film.

The NiFe adhesion layer shows good adhesivity to the Cu stud but its adhesivity to alumina is very low. Therefore, decreasing its area of contact with the Cu stud or relatively increasing its area of contact with the alumina may result in an insufficient adhesivity of the gold pad. For SBB, the laser power must be minimized so as not to give excessive thermal stress to the periphery of the gold pad. In this respect, it is preferable to make smaller the area of the Cu stud. Since the thermal conductivity of Cu is higher than that of alumina, if the area of the Cu stud is large, the laser irradiation results in a large amount of heat radiated away through the Cu stud. In this case, if energy is not sufficiently used to melt the solder, it may be necessary to excessively raise the laser energy, resulting in the occurrence of excessive stress around the gold pad and cracks in the alumina protective film. On the other hand, reducing the area of the Cu stud makes it possible to lower the laser power since the thermal radiation is reduced. Lowering the laser power reduces thermal stress around the gold pad and therefore avoid cracks in the alumina protective film. However, since the NiFe adhesion layer does not allow the area of the Cu stud to be reduced as mentioned above, it is not possible to lower the laser power.

Cr is sometimes used instead of NiFe since a Cr adhesion layer shows good adhesivity to alumina when the film is formed thereon and therefore a gold pad formed using the Cr adhesion layer is strongly adhered. However, such gold pads were peeled off and disconnected as a result of a high temperature-included temperature cycle test that was carried out. This phenomenon may be attributable to the high temperature heating which may cause Cr diffusion into the Au to such an extent that Cr disappears from the interface with the alumina.

Embodiments of the present invention are directed to the heat tolerance for laser heating in the SBB process. It is an object of embodiments of the present invention to provide a magnetic slider whose slider pads are reliable gold pads which show a heat-tolerance enough high to endure laser heating in the SBB process and do not peel off during high temperature-included temperature cycle test.

Here, representative embodiments of the present invention are briefly described. This is a magnetic slider comprising: a read element; a write element; plural wiring lines connected to the read element and write element; a protective film which covers the read element, write element and plural wiring lines; plural slider pads provided on the protective film; and plural studs which connect slider pads to wiring lines and are covered by the protective film, wherein each of the slider pads comprises a chromium film, a nickel iron film and a gold film which are formed such that the nickel iron film is disposed between the chromium film and the gold film and the chromium film is disposed between the nickel iron film and the stud and made in contact with the protective film.

Thanks to the superior heat-tolerance, the above-mentioned magnetic slider has a sufficiently large process margin for the laser conditions in the SBB process. That is, the control margin for the laser power and other process conditions in the SBB process is improved. In addition, the high heat tolerance makes it possible to provide a highly reliable magnetic slider which does not deteriorates even after high temperature-included temperature cycle test is done. Further, since the Cu stud area can be reduced thanks to the high adhesivity to alumina, it is possible to lower the laser power and consequently avoid the occurrence of cracks in the alumina protective film.

Figure 2:
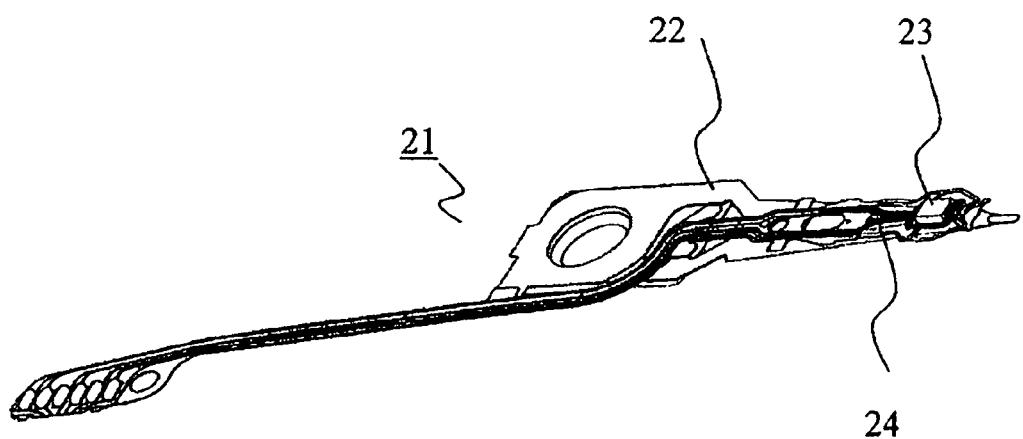
FIG. 2 provides a general view of a HGA.
Figure 3:
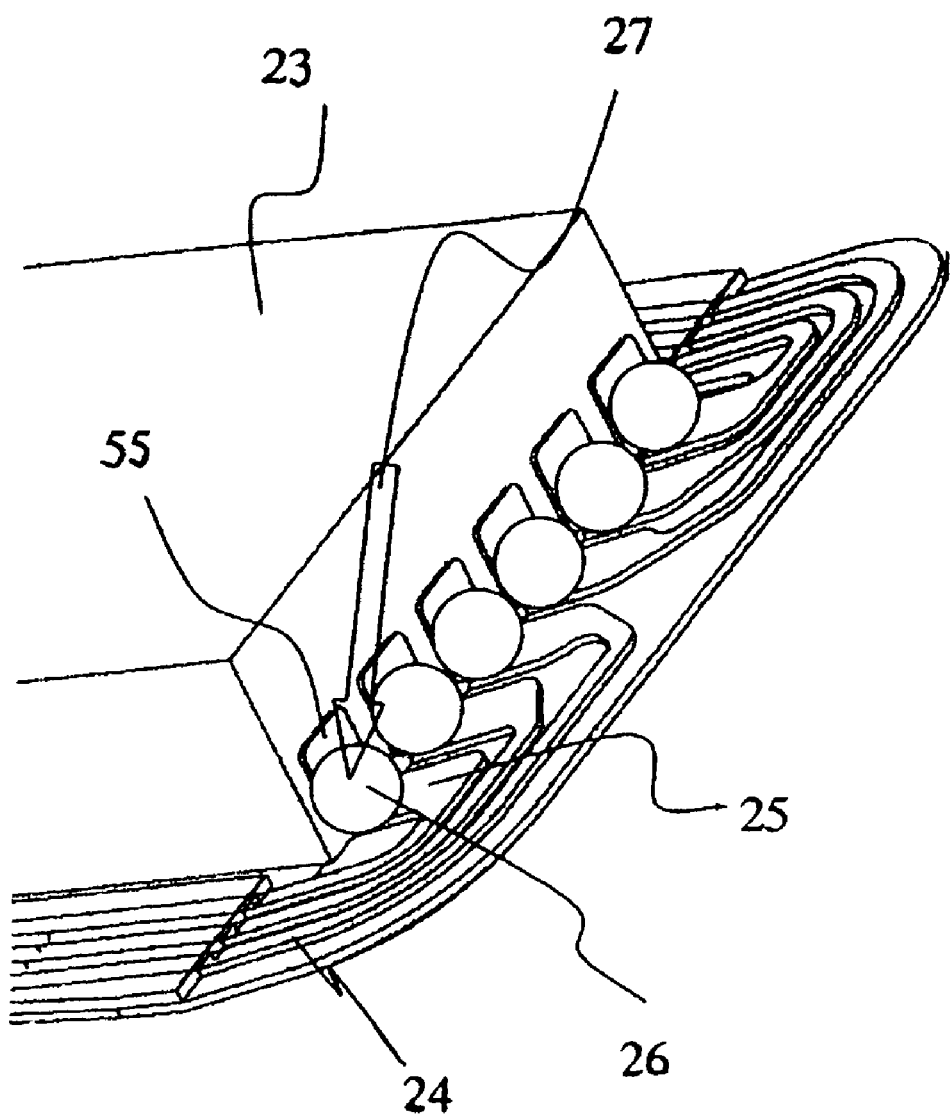
FIG. 3 is a perspective view to show how a slider pad, lead pad and solder ball are aligned.
Figure 4:
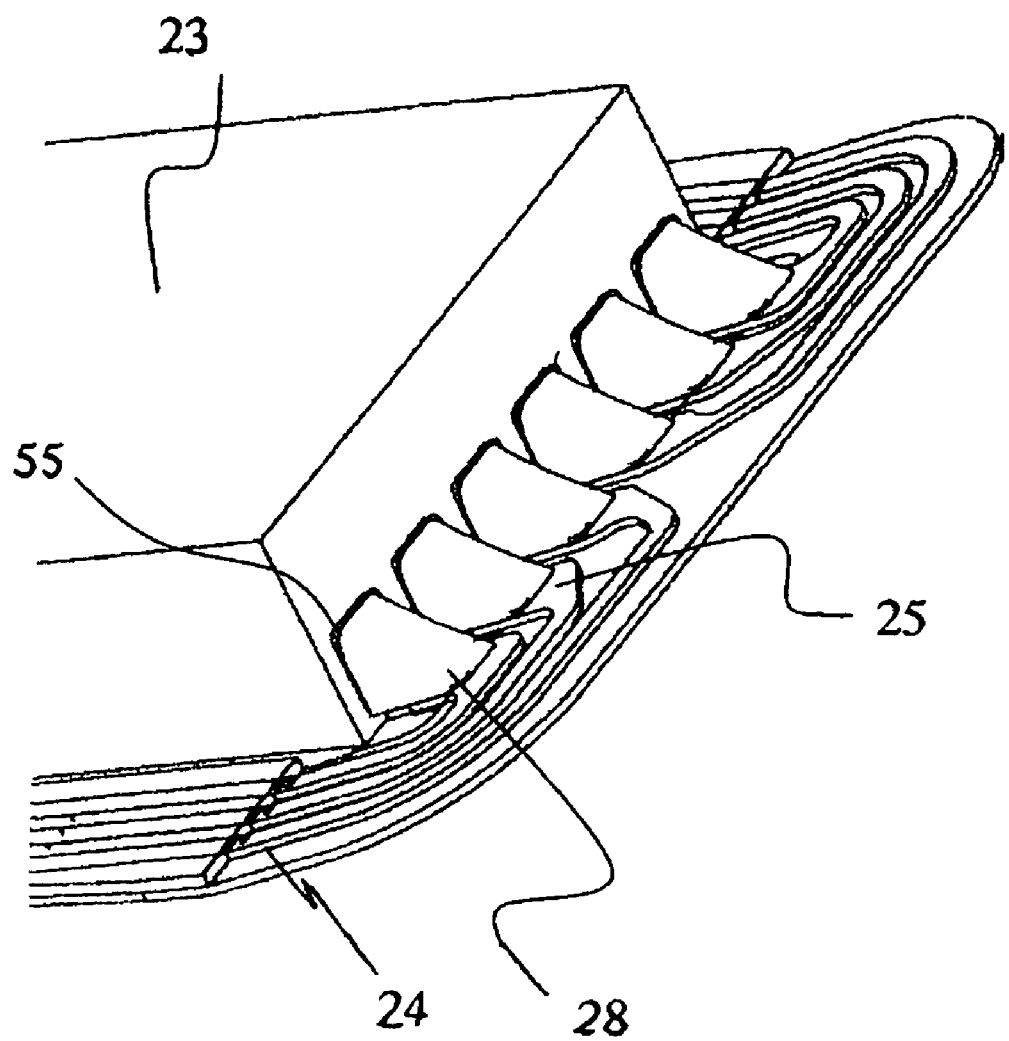
FIG. 4 is a perspective view showing melted solder balls.

The following will describe embodiments of the present invention with reference to the drawings. FIG. 2 provides a general view of a head gimbal assembly HGA 21. A head slider 23 is fixed onto a suspension 22 with adhesive and electrically connected to wiring lines 24 on the suspension 22. FIG. 3 is an enlarged perspective view of a portion where the magnetic slider 23 is connected to the wiring lines 24. The electrical interconnection is done by SBB process. For wire bonding to a gold pad, a gold ball is pressed to the gold pad while ultrasound is applied thereto. This forms fresh gold surfaces on the respective sides and causes plastic flows which bond them together. The SBB process uses a different bonding phenomenon to bond a gold pad to a suspension pad by melting a solder ball through laser irradiation. In the SBB process, a solder ball 26 is placed between a slider pad 55 and a lead pad 25 and the solder ball 26 is irradiated with a laser beam 27. This laser irradiation melts the solder, resulting in the slider pad 55 connected electrically with the lead pad 25. In FIG. 4, the solder is melted. The solder ball 70 has a major diameter of, for example, 80 µm, 110 µm or 130 µm. The solder ball 26 is lead-free.

Figure 5:
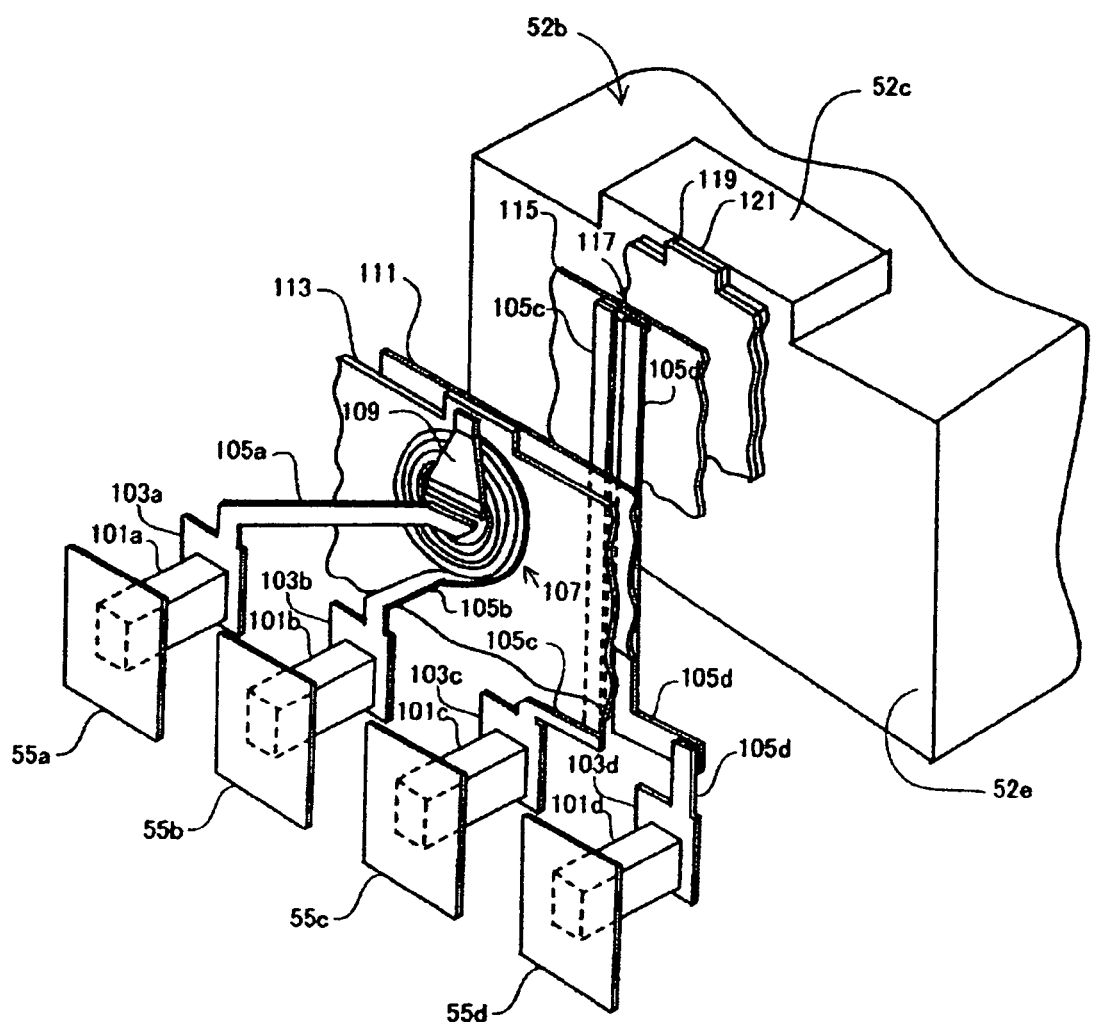
FIG. 5 is an exploded perspective view showing the major portion of the slider.
Figure 6:
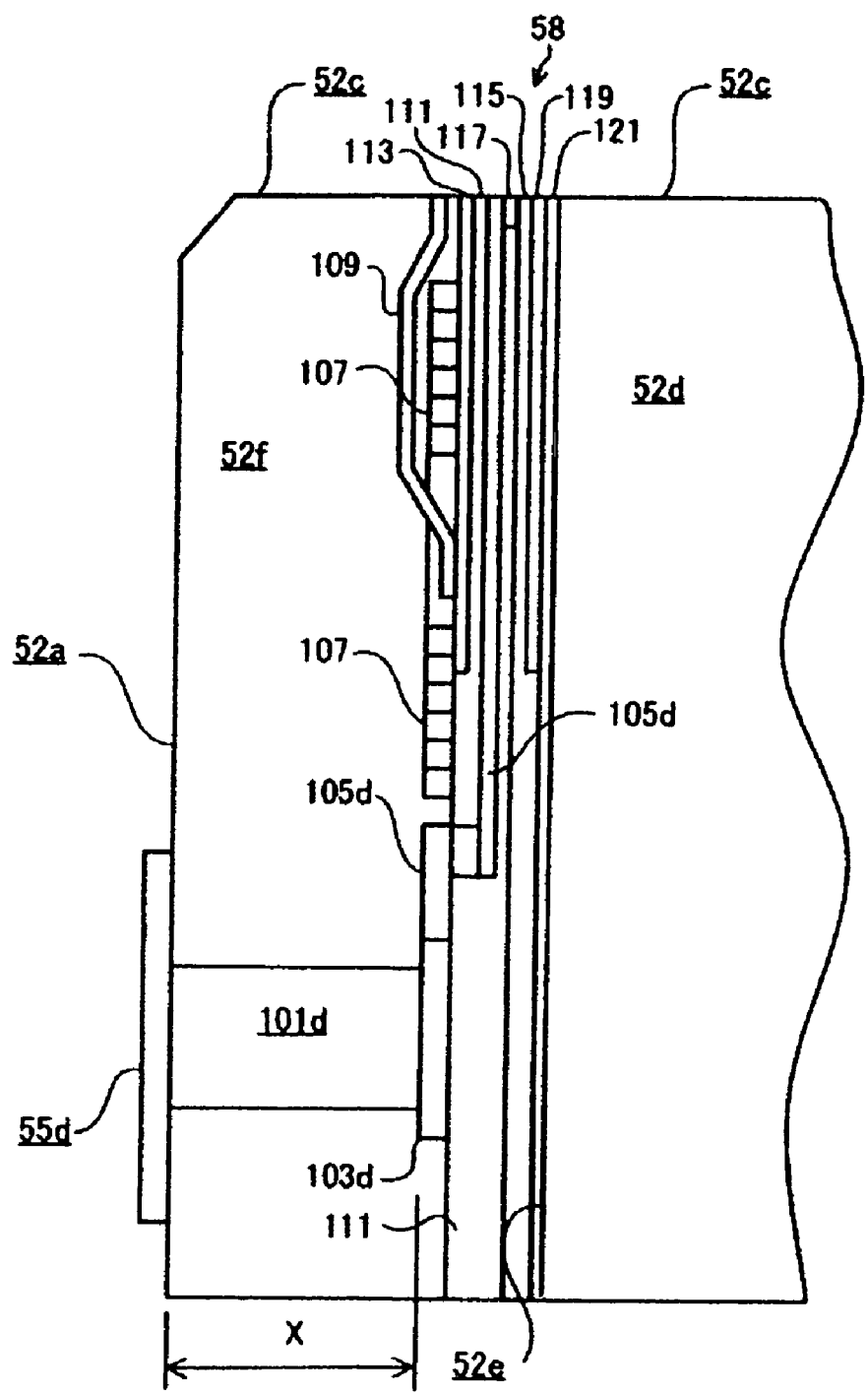
FIG. 6 shows a cross section of a magnetic slider of the present invention.

FIG. 5 is a perspective view provided to schematically explain the structure of a portion of the magnetic slider 23 including the slider pads. FIG. 6 shows a section of the magnetic slider 23 cut perpendicular to the ABS 52b and the body edge 52 where major components are included. The outline of the magnetic slider 23 is formed by a rectangular body 52d, which is, for example, a sinter of Al, Ti and C called AlTiC, and by a protective film 52f deposited on one body edge 52e. Four slider pads 55a, 55b, 55c and 55d are respectively connected to the write and read head sections which are formed in the magnetic slider 23. For simplicity, the number of slider pads is assumed to be four in this figure. As shown in FIGS. 3 and 4, two more slider pads may be formed between the four slider pads which are respectively connected to the write and read head sections. These two slider pads are connected to a heater which is formed in the magnetic slider in order to adjust the flying height.

In a magnetic disk drive where the magnetic slider 23 is installed, the ABS 52b faces a magnetic disk surface and receives a buoyant force from an air flow thereon. By etching the AlTiC, a center pad 52c and other various outer pattern features are formed thereon. In and near the center pad 52c area, the body edge 52e perpendicular to the ABS 52b has the write and read head sections formed by thin film process to constitute the magnetic head 58.

The thin film magnetic head 58 formed in the magnetic slider 23 is a combination magnetic head in which a read head section to reproduce magnetic information recorded on a magnetic disk 3 and a write head section to record magnetic information on the magnetic recording medium are integrated. For example, the read head section is fabricated by sequentially stacking an insulation layer 121, lower shield layer 119, gap layer 115, read transducer 117, gap layer 111 and upper shield layer 113 on the body 52d near to the ABS 52b. The upper shield layer 113 also serves as the lower magnetic shield of the write head section. The upper shield layer 113 and auxiliary pole of the write head section may be formed from separate ones. Between the gap layers 111 and 115, a read element 117 comprised of a giant magneto-resistive film (GMR film) and a magnetic domain control film is formed. To read information recorded on the magnetic disk 3, the read element 117 is arranged so as to face the ABS 52b. If the read element is a tunneling magneto-resistive device (TMR device) where current flows in the film thickness direction, the gap layer 115 between the lower shield layer 119 and the read element 117 and the gap layer 111 between the upper shield layer 113 and the read element 117 can be eliminated and the upper and lower electrodes which sandwich the read element 117 can also serve as shields. To the read element 117, one pair of lead layers 105c and 105d is connected. The lead layers 105c and 105d are formed of a metal such as tantalum (Ta). The lead layers 105c and 105d are respectively connected to the internal pads 103c and 103d which are formed above the read head section.

The write head section is comprised of a main pole 109, shield layer 113 and coil 107. The main pole 109 and the shield layer 113 are magnetically connected at the center of the coil 107, which comprises a magnetic circuit with a recording gap formed around the ABS 52b. Along this magnetic circuit, a magnetic flux produced by the current flowing through the internal coil 107 is passed. One end of the coil 107, located at the center, is connected to the lead layer 105a. The other or peripheral end is connected to the lead layer 105b.

The lead layers 105a and 105b are respectively connected to the internal pads 103a and 103b which are formed above the gap layer 111. The internal pads are copper layers formed by sputtering or CVD. To the internal pads 103a, 103b, 103c and 103d, electrode studs 101a, 101b, 101c and 101d are respectively connected. Each electrode stud is a column with a square section perpendicular to the flowing direction of current. Having a length X of 30 μm, it is formed by such a method as copper plating. To the electrode studs 101a, 101b, 101c and 101d, the slider pads 55a, 55b, 55c and 55d are respectively connected.

The magnetic head 58, lead layers 105a, 105b, 105c and 105d, internal pads 103a, 103b, 103c and 103d and electrode studs 101a, 101b, 101c and 101d, which are formed on the body edge 52e, are covered by the alumina protective film 52f. The slider pads 55a, 55b, 55c and 55d are formed on the surface of the protective film 52f or the trailing edge surface 52a. Each electrode stud, internal pad and lead layer set constitutes a separate current path from its slider pad to the magnetic head. Of each current path, the portion which is directly connected to the slider pads is formed separately from the lead layers 105a, 105b, 105c and 105d. Thus, since the lead layers cannot be connected directly to the slider pads 55a, 55b, 55c and 55d, the electrode studs 101a, 101b, 101c and 101d are provided.

Each slider pad is connected to a lead pad by SBB process. During write, a magnetic flux occurs between the upper shield layer 113, which serves also as the lower magnetic pole, and the upper magnetic pole 109 if write current is supplied via the slider pads 55a and 55b, causing a recording signal magnetic field around the recording gap. By this signal magnetic field, it is possible to record information by magnetizing the magnetic disk. During read, sense current is supplied to the GMR film of the read element 117 via the slider pads 55c and 55d. The GMR film changes its resistance depending on the magnetic field from the magnetic disk. It is therefore possible to read information recorded on the magnetic disk by detecting the change of the resistance as a voltage.

FIG. 1 is a diagram to show the configuration of the slider pad according to the present embodiment. The upper portion of FIG. 6 including the internal pad 103d is enlarged. The slider pad 55 has a chromium (Cr) film 30, a nickel iron (NiFe) film 31 and a gold (Au) film 13. The Cr film 30 is disposed between the NiFe film 31 and the stud 101 to secure adhesion between the stud and the upper layer. The NiFe film 31 is disposed between the Au film 13 and the Cr film 30. When the slider pad 55 and the lead pad 28 are connected by SBB process, the molten solder ball reacts with Au to form an AuSn alloy. The NiFe film 31 is disposed as a diffusion prevention layer to prevent the gold tin (AuSn) alloy from diffusing into the copper (Cu) stud. Preferably, the Cr film 30 is 20 to 100 nm in thickness. If the Cr film 30 is excessively thin, it is difficult to secure adhesion to the alumina. If the Cr film 30 is made excessively thick, the film may peel off since the stress in the film becomes larger. Preferably, the NiFe film 31 is 40 to 100 nm in thickness. If the NiFe film 31 is excessively thin, it is difficult to prevent Cr diffusion into the Au and Sn diffusion into the Cu. As well, making the NiFe film 31 excessively thick lowers the productivity since the stress in the film is enlarged. Preferably, its Ni content is not lower than 40% since Ni functions to prevent diffusion. Preferably, the Au thickness is 1 to 10 μm. After depositing most of this thickness by sputtering, the film is finished by plating. The Au film has the purpose of securing solder wettability in the SBB process. To produce a sufficiently thick AuSn alloy by reaction with the solder, it is preferable to make the Au film not thinner than 1 μm. In view of cost, the Au film should be thinned. Functionally, it is not necessary to make the film thicker than 10 μm.

Figure 7:
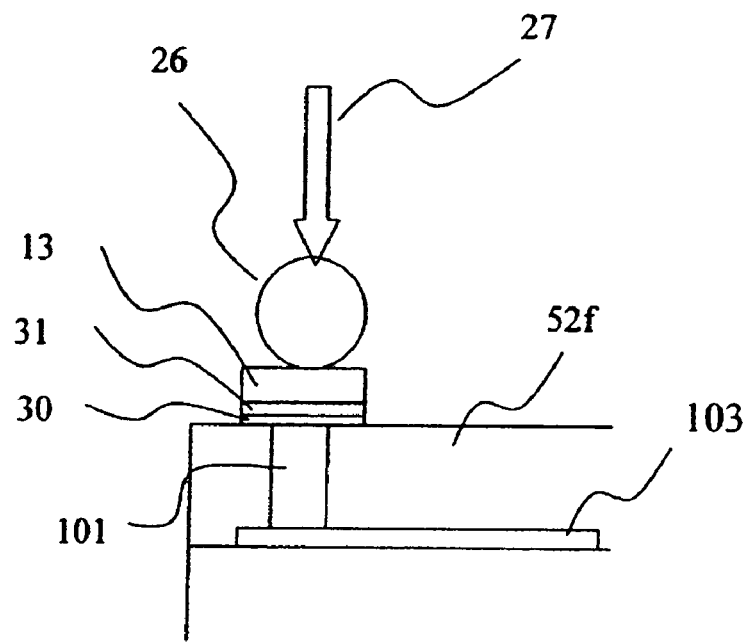
FIG. 7 is a cross sectional view provided to explain the SBB process before the solder ball is melted.
Figure 8:
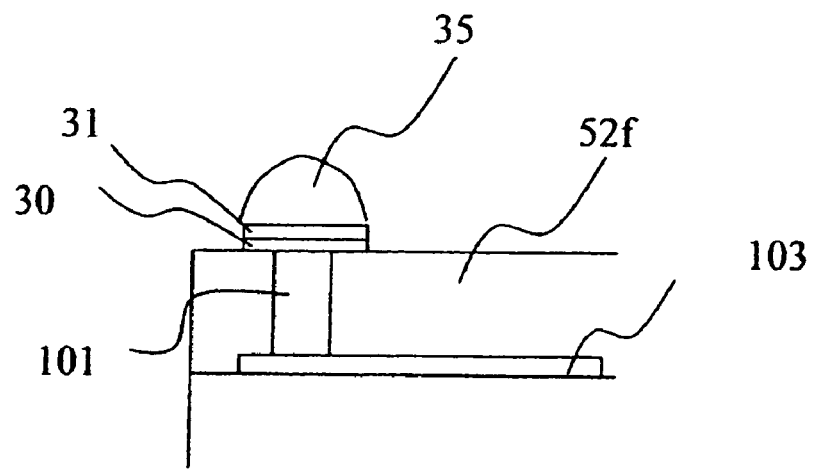
FIG. 8 is a cross sectional view provided to explain the SBB process after the solder ball is melted.

To verify the effect of employing the Cr/NiFe/Au slider pad 55, we examined characteristics of its Cr50 nm/NiFe50 nm/Au5.1 μm (100 nm sputtered and 5 μm plated) sample in comparison with corresponding ones. As shown in FIG. 7, we placed a solder ball 26 on each slider pad 55 and irradiated it with a laser beam 27. The slider pads prepared as examples for comparison with the Cr/NiFe/Au sample were: comparative example 1—Cr50 nm/Au5.1 μm (100 nm sputtered and 5 μm plated); comparative example 2—Ta50 nm/Au5.1 μm (100 nm sputtered and 5 μm plated); and comparative example 3—Cr50 nm/Ta50 nm/Au5.1 μm (100 nm sputtered and 5 μm plated). Cr is expected to secure adhesion to the alumina. Ta is expected to suppress mutual inter-metal diffusion by Au, Cu, AuSn alloy, etc. We carried out SBB process for each specimen. As shown in FIG. 8, laser irradiation melts the solder to spread over the gold pad. The molten solder reacts with the Au film to produce the AuSn alloy 35. After the SBB process, we evaluated the shear strength of each specimen. FIG. 9 shows the result. The laser energy (LASERENG) was set to a typical level of 35 mJ and, as acceleration conditions, to 55 mJ and 110 mJ. Ten samples were tested for each of the prepared specimen groups: present embodiment (SAMP), comparative example 1 (COMP1), comparative example 2 (COMP2) and comparative example 3 (COMP3). Plotted in this figure are their average shear fracture strength (STRENGTH). According to the figure, all specimens had almost the same shear fracture strength of 110 g with no significant difference if soldering was done with the laser energy set to 35 mJ. Setting the laser energy to 55 mJ also resulted in almost the same shear fracture strength around 110 g with no difference among the specimens. However, after soldering was done with the laser energy raised to 110 mJ, the comparative example 1 (conventional structure), comparative example 2 and comparative example 3 showed shear fracture strengths of 60 g, 85 g, and 85 g respectively while the present embodiment showed the highest shear fracture strength of 93 g. That is, the present slider pad embodiment can maintain the largest adhesivity since its deterioration is small even if the laser energy is maximized for acceleration. This slider pad structure can widen the process margin with respect to the laser energy.

Figures 11, 12:
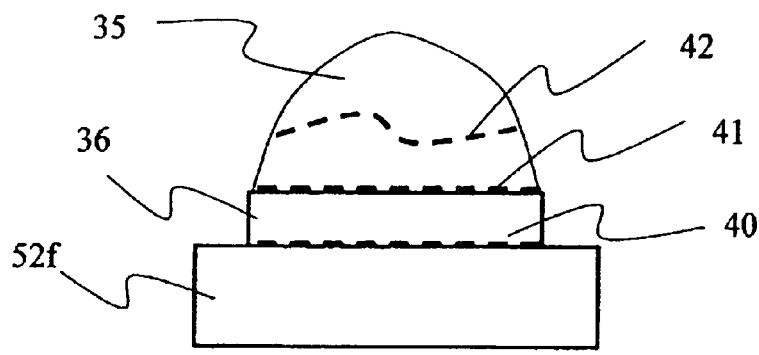
FIG. 11 is a schematic diagram to indicate fracture planes caused by shear fracture strength test.
FIG. 12 shows failure modes caused by temperature cycle test.

After shear fracture strength measurement was performed on specimens soldered with the laser energy set to 110 mJ for maximum acceleration, we observed their fracture planes. As shown in FIG. 11, the fracture planes are classified into three types: those along the boundary between the alumina and the adhesion layer (including the diffusion preventing layer); those along the boundary between the adhesion layer and the AuSn alloy layer; and those in the AuSn alloy region. If a specimen showed more than one type of fracture plane, the fracture plane having the largest area was considered as the specimen's fracture plane. FIG. 10 shows the result. In the case of the comparative example 1 (Cr/Au) which showed the smallest adhesivity as described above, 80% fractured along the boundary between the alumina and the adhesion layer (Cr). It is certain that the Cr diffusion into the Au layer was increased during laser heating at 110 mJ, resulting in the deteriorated adhesivity to the alumina. For the comparative example 2 (Ta/Au) and comparative example 3 (Cr/Ta/Au) which showed intermediary adhesivity, the majority (Ta/Au 50%, Cr/Ta/Au 80%) were fractured along the boundary between the Ta layer and the AuSn alloy layer, indicating deterioration of the adhesivity between the Ta layer and the AuSn alloy layer. In the case of the present Cr/NiFe/Au embodiment which showed the largest adhesivity, 70% caused fracture in the AuSn alloy region. This indicates no adhesivity problem occurs between the alumina and the Cr layer, between the Cr layer and the NiFe layer or between NiFe layer and the Au layer even if 110 mJ laser irradiation is done.

Further, we performed a high temperature-included temperature cycle test on specimens after they were given the SBB process with the laser power set to the typical level of 35 mJ. The temperature cycle test repeated 300 temperature cycles. In each temperature cycle, the temperature was set to 125° C. for 30 minutes and then set to −40° C. for 30 minutes. After that, we evaluated the conduction NG rates by measuring the resistance of a head element of each specimen via the gold pads and evaluated the condition of each gold pad to check if the pad was peeled off by observing its external appearance and cross section by SEM. In addition, we carried out an elemental analysis of cross sections of gold pads to examine the mutual diffusion of constituent metals. FIG. 12 shows results of these evaluations. While the comparative example 1 of the conventional structure showed a conduction NG rate of 2.2%, no failure occurred in the other specimens. Accordingly, some included in the comparative example 1 were found to be peeled off by SEM-used external appearance observation. In the case of the comparative example 2 and comparative example 3, peel off was found along the boundary between the TA and the AuSn alloy by SEM-used cross-section observation. By the elemental analysis made of cross sections of gold pads, Sn diffusion into the Cu stud was verified in the comparative example 1, comparative example 2 and comparative example 3. In the present pad embodiment, Sn diffusion into the Cu pad was not found. This result indicates that Ta does not sufficiently function as the diffusion preventing layer to suppress Sn diffusion from the AuSn alloy. On the other hand, it is found that NiFe in the present embodiment functions as the diffusion preventing layer to suppress the diffusion of Sn.

The above-mentioned evaluation results indicate the stud pad structure (Cr/NiFe/Au) according to embodiments of the present invention is sufficiently heat-tolerant even if the applied laser energy is raised to accelerate the deterioration. In addition, since it showed the best result in the high temperature-included temperature cycle test, this structure is verified to be superior in reliability for commercialization. This structure can not only secure the adhesivity of the laser-bonded gold pad but also improve the device.

What is claimed is:

1. A magnetic slider comprising:
a read element and a write element;
plural wiring lines which are connected to the read element and the write element;
a protective film which covers the read element, the write element and the plural wiring lines;
plural slider pads formed on the protective film; and
plural studs which respectively connect the slider pads and the wiring lines and are covered by the protective film;
wherein:
the plural slider pads are formed on a surface between an air bearing surface and a surface opposite to the air bearing surface;
each of the slider pads comprises a chromium film, a nickel iron film and a gold film;
the nickel iron film is formed between the chromium film and the gold film, wherein the gold film is in contact with the nickel iron film; and
the chromium film is formed between the nickel iron film and one of the studs and is in contact with the protective film, wherein the nickel content of the nickel iron film is not lower than 40% and not higher than 85% and wherein the chromium film has a thickness of 20-100 nm and wherein the gold film has a thickness of 1-10 µm.

2. A head gimbal assembly comprising:
a magnetic slider comprising;
a read element and a write element,
plural wiring lines which are connected to the read element and the write element,
a protective film which covers the read element, the write element and the plural wiring lines,
plural slider pads formed on the protective film, and
plural studs which respectively connect the slider pads and the wiring lines and are covered by the protective film; and
a suspension assembly comprising plural lead wires which are respectively connected to plural lead pads, a flexure and a load beam;
wherein:
each of the slider pads comprises a chromium film, a nickel iron film and a gold film;
the nickel iron film is formed between the chromium film and the gold film, wherein the gold film is in contact with the nickel iron film;
the chromium film is formed between the nickel iron film and one of the studs and is in contact with the protective film;
the slider pads are formed on a surface between an air bearing surface and a surface opposite to the air bearing surface; and
the surface of the magnetic slider opposite to the air bearing surface is attached to the flexure, and the slider pads are respectively connected to the lead pads by melting solder balls, wherein the nickel content of the nickel iron film is not lower than 40% and not higher than 85% and wherein the chromium film has a thickness of 20-100 nm and wherein the gold film has a thickness of 1-10 µm.

3. A method for manufacturing a head gimbal assembly, the method comprising the steps of:
fabricating a magnetic slider comprising;
a read element and a write element,
plural wiring lines which are connected to the read element and the write element,
a protective film which covers the read element, the write element and the plural wiring lines,
plural slider pads formed on the protective film, and
plural studs which respectively connect the slider pads and the wiring lines and are covered by the protective film; and
attaching the magnetic slider to a flexure of a suspension assembly comprising plural lead wires which are respectively connected to plural lead pads, the flexure and a load beam, placing solder balls respectively between the slider pads and the lead pads and irradiating the solder balls by a laser;
wherein:
each of the slider pads comprises a chromium film, a nickel iron film and a gold film;
the nickel iron film is formed between the chromium film and the gold film, wherein the gold film is in contact with the nickel iron film; and
the chromium film is formed between the nickel iron film and one of the studs and is in contact with the protective film wherein the nickel content of the nickel iron film is not lower than 40% and not higher than 85% and wherein the chromium film has a thickness of 20-100 nm and wherein the gold film has a thickness of 1-10 µm.

* * * * *